(12) United States Patent
Davis et al.

(10) Patent No.: US 7,125,230 B2
(45) Date of Patent: Oct. 24, 2006

(54) VALVE WITH OPERATION PARAMETER SET AT ASSEMBLY AND PUMP USING SAME

(75) Inventors: William M. Davis, Elmwood, IL (US); Casey C. O'Connor, Peoria, IL (US); Ryan P. Michels, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 408 days.

(21) Appl. No.: 10/191,913

(22) Filed: Jul. 9, 2002

(65) Prior Publication Data
US 2004/0009080 A1   Jan. 15, 2004

(51) Int. Cl.
*F04B 39/00* (2006.01)
*F04B 53/00* (2006.01)

(52) U.S. Cl. .................. 417/454; 137/509; 137/15.18; 137/315.11; 29/890.131

(58) Field of Classification Search ................ 137/509, 137/15.18, 315.11; 29/890.131; 417/454
See application file for complete search history.

(56) References Cited

U.S. PATENT DOCUMENTS

| | | | |
|---|---|---|---|
| 2,393,544 A | | 1/1946 | Lum |
| 3,650,294 A | * | 3/1972 | Satoh .......................... 137/509 |
| 3,886,969 A | * | 6/1975 | Shira et al. .................. 137/509 |
| 3,943,968 A | * | 3/1976 | Treichler .................... 137/493 |
| 4,116,417 A | * | 9/1978 | Larsen ........................ 251/122 |
| 4,152,932 A | | 5/1979 | Johnson |
| 4,494,570 A | * | 1/1985 | Adkins ........................ 137/590 |
| 4,531,492 A | | 7/1985 | Gibson |
| 4,531,494 A | | 7/1985 | Bailey et al. |
| 4,541,391 A | | 9/1985 | Gibson |
| 4,671,063 A | * | 6/1987 | Anaker ........................ 60/458 |
| 4,718,442 A | | 1/1988 | Nicoll |
| 4,723,725 A | * | 2/1988 | Comment ................. 239/533.1 |
| 5,099,876 A | * | 3/1992 | Rosenberg ................... 137/509 |
| 5,213,132 A | * | 5/1993 | Comment .............. 137/505.25 |
| 5,515,829 A | | 5/1996 | Wear et al. |
| 5,603,609 A | | 2/1997 | Kadlicko |
| 5,707,210 A | * | 1/1998 | Ramsey et al. ............... 417/32 |
| 5,727,594 A | * | 3/1998 | Choksi ........................ 137/859 |
| 6,035,828 A | | 3/2000 | Anderson et al. |
| 6,116,273 A | * | 9/2000 | Tarr et al. .................... 137/539 |
| 6,374,852 B1 | * | 4/2002 | Olivas ..................... 137/493.9 |
| 6,401,749 B1 | * | 6/2002 | Tai et al. ..................... 137/540 |
| 6,447,257 B1 | * | 9/2002 | Orschell ...................... 417/201 |
| 6,457,945 B1 | * | 10/2002 | Kleppner et al. ............. 417/84 |
| 6,494,688 B1 | * | 12/2002 | Barito et al. ................ 417/310 |

(Continued)

FOREIGN PATENT DOCUMENTS

AU      65406/80      6/1981

(Continued)

*Primary Examiner*—William H. Rodriguez
(74) *Attorney, Agent, or Firm*—Liell & McNeil

(57) ABSTRACT

A valve is assembled by telescoping a first body component relative to a second body component until reaching a relative position that corresponds to a predetermined valve operation parameter, such as a valve opening pressure. The first body component is then fixed with respect to the second body component at the relative position, such as by laser welding. The present invention finds potential application as a cartridge valve for a pump, such as a pressure relief valve and/or pressure reduction valve. The relative positioning control over the body components de-sensitizes valve operation from variations in valve components, such as variations attributable to geometrical tolerances.

18 Claims, 4 Drawing Sheets

U.S. PATENT DOCUMENTS 6,655,925 B1 * 12/2003 Robenalt et al. ............ 417/234
6,679,683 B1 * 1/2004 Seibel et al. ................ 417/213
6,742,995 B1 * 6/2004 Wood et al. ................ 417/234
6,877,525 B1 * 4/2005 Fischer et al. .............. 137/541
6,910,494 B1 * 6/2005 Warsakis ................. 137/15.18
2001/0045241 A1 * 11/2001 Takeda et al. ................ 141/18

FOREIGN PATENT DOCUMENTS

AU        65406 80     6/1981
WO    WO 97/47883    12/1997

* cited by examiner

VALVE WITH OPERATION PARAMETER SET AT ASSEMBLY AND PUMP USING SAME

TECHNICAL FIELD

The present invention relates generally to valves, and more particularly to valves with a preset operation parameter.

BACKGROUND

In one class of valves, the valve member is intended to move to a particular position when acted upon by a predetermined force. For instance, in the case of a pressure relief valve, the valve member would be biased toward a closed position, but could open when fluid pressure acting on an opening hydraulic surface exceeds some predetermined valve opening pressure. In another example, a pressure reducing valve moves to an open position when pressure on the low pressure side of the valve drops below some predetermined valve opening pressure. Because these valves must often be comprised of several components, and each of those components must have a realistic manufacturing tolerance, mass producing valves with consistent valve opening pressures can be problematic. Some of these problems can be attributed to difficulty in setting a desired valve operation parameter, such as valve opening pressure, when stacked geometrical or other tolerances result in a plurality of valves all with slightly differently shaped or strengthened components. Variations on the desired valve operation parameter can often be a strong function of variability among component tolerances, and the problem is often compounded by stacked tolerances from multiple components.

The present invention is directed to these and other problems associated with mass producing valves with consistent and/or predictable valve operating parameters.

SUMMARY OF THE INVENTION

In one aspect, a valve assembly includes a first body component fixed with respect to a second body component in a selected relative position, which corresponds to a predetermined valve operation parameter, such as a valve opening pressure.

In another aspect, a method of assembling a valve includes a step of adjusting a relative positioning of a first body component relative to a second body component until reaching a relative position that corresponds to a predetermined valve operation parameter. The first body component and the second body component are then fixed in the relative position.

In still another aspect, a pump includes at least one cartridge valve assembly threadably attached to a pump body. Each of the cartridge valves has a first body component fixed with respect to a second body component in a selected relative position that corresponds to a predetermined valve operation parameter.

DETAILED DESCRIPTION

Figure 1:
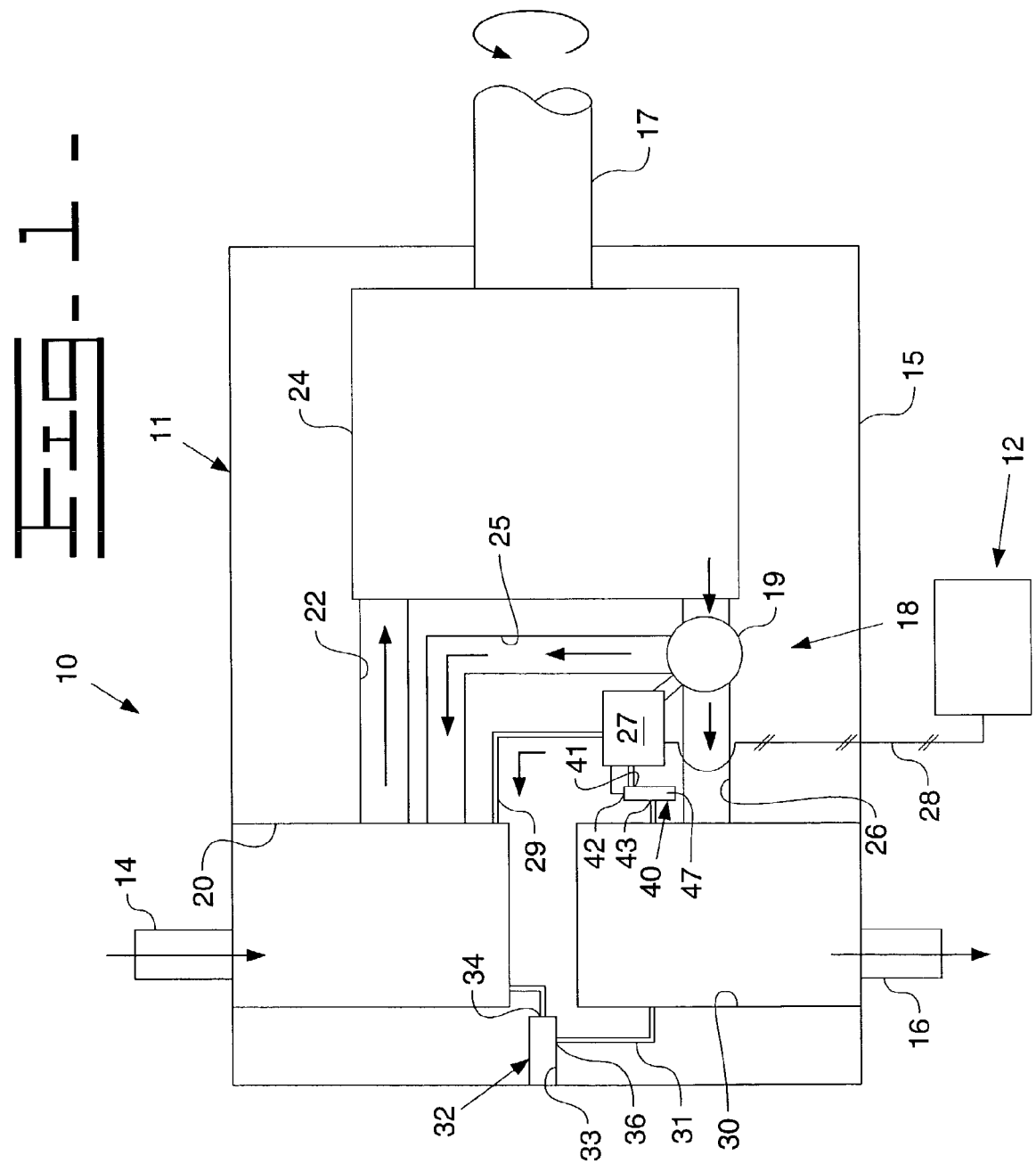
FIG. 1 is a schematic illustration of a pump according to one aspect of the present invention.

Referring now to FIG. 1, a pump system 10 includes an electronically controlled pump 11, which is controlled in a conventional manner by an electronic control module 12. For instance, pump 11 could be a known fixed displacement, variably output axial piston pump of a type generally described in co-owned U.S. Pat. No. 6,035,828 to Anderson et al. For example, that pump might include a plurality of pistons driven to reciprocate by a rotating angled swash plate. An output controller would control whether the fluid displaced by the pump pistons is pushed into a high pressure outlet or merely returned to a low pressure side for recirculation. The output controller could be of any suitable structure and be controlled by an electronic control module 12 in a conventional manner.

Pump 11 includes a low pressure inlet connected to a low pressure inlet gallery 20, and a high pressure outlet 16 connected to a high pressure outlet gallery 30. Low pressure inlet gallery 20 and high pressure gallery 30 are potentially connectable via pumping portion 24, a controller leak passage 29 or a pressure relief passage 31. In one aspect of the invention, pump body 15 includes a cartridge cavity 33 holding a pressure relief valve to normally close pressure relief passage 31. In another aspect, a pressure reduction valve 40 is positioned in a cartridge cavity 47 so that pump output controller 18 is provided with a relatively medium pressure, which is stepped down from the high pressure output gallery 30. When in operation, a rotating shaft 17 causes a pump portion 24 to draw fluid from low pressure inlet gallery 20 via internal supply passage 22, and deliver the same to a fluid diverting means 19. Depending upon the state of fluid diverting means 19, a usually large portion of the fluid is pushed into high pressure outlet gallery 30 via high pressure passage 26, and a typically lessor portion is diverted into low pressure passage 25 for recirculation to low pressure inlet gallery 20. Fluid diverting means 19 is a portion of pump output controller 18, which also includes an electro hydraulic actuator 27 in communication with electronic control module 12 via a communication line 28.

The output rate of pump 11 is generally determined by the rotation rate of shaft 17 and the ratio of fluid delivered to respective high pressure passage 26 and low pressure return passage 25 by fluid diverting means 19, as determined by electro hydraulic actuator 27. For example, fluid diverting means 19 could represent a set of sleeves mounted around pump pistons. The sleeves can be moved by an electro hydraulic actuator 27 between positions that port different fractions of the pumping piston's stroke fluid back to the low pressure inlet gallery 20. The sleeves can also be positioned such that virtually all of the fluid displaced by the pump pistons is pushed into high pressure passage 26. In one example, the electro hydraulic actuator 27 consumes some relatively small amount of high pressure fluid from outlet gallery 30 to perform its function of adjusting the state of fluid diverting means 19. However, the amount of fluid used for this purpose is reduced, and the pressure at which the output controller 18 operates is made relatively uniform by the inclusion of pressure reduction valve 40. The pressure reduction valve 40 is intended to provide electro hydraulic actuator 27 with a steady supply of uniform pressure fluid via a reduction valve inlet 43 and a reduction valve outlet 41. The state of pressure reduction valve 40 is preferably determined via a reduction valve pressure tap 42, which communicates the operating pressure of the electro hydraulic actuator 27 to pressure reduction valve 40. When pressure in electro hydraulic actuator 27 drops below a predetermined threshold, pressure reduction valve 43 opens inlet 43 larger to outlet 41 to raise pressure in actuator 27. When pressure exceeds a predetermined maximum pressure, pressure reduction valve 43 can move toward a closed position. When pressure in outlet gallery 30 exceeds a predetermined maximum, pressure relief valve 32 relieves pressure to inlet gallery 20 via pressure relief passage 31. In particular, when pressure in the upstream portion of relief passage 31 exceeds a predetermined pressure, relief valve inlet 36 is opened to relief valve outlet 34 to vent excess pressure.

Figure 2:
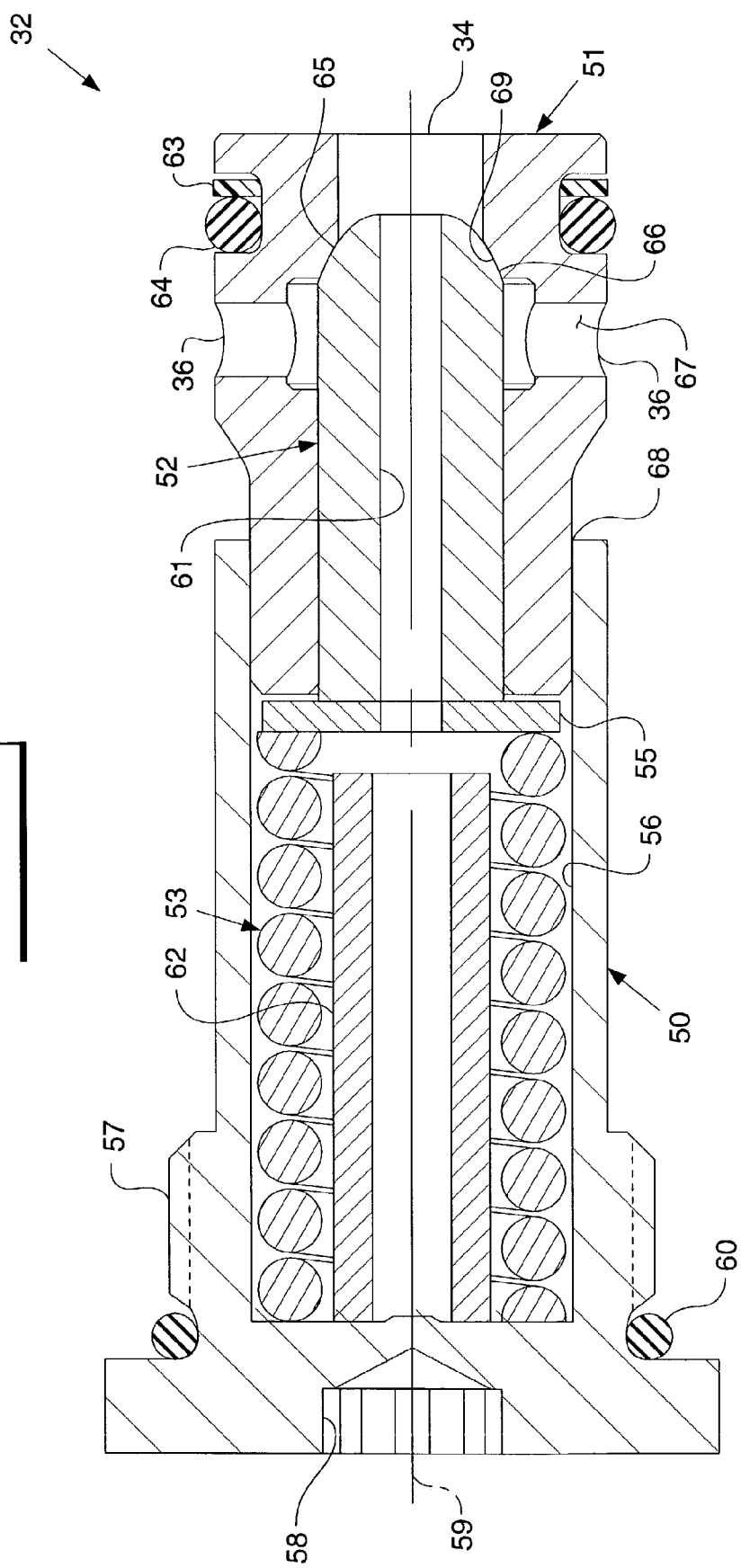
FIG. 2 is a sectioned side diagrammatic view of a pressure relief valve according to another aspect of the present invention.

Referring now to FIG. 2, pressure relief valve 32 is preferably a cartridge type valve that includes a plug body component 50 attached to a seat body component 51 to contain a valve member 52 and a biasing spring 53. A pneumatic, hydraulic, magnetic, or other spring type could be substituted as a biaser in place of spring 53. Biaser 53 normally biases valve member 52 toward a position that places valve surface 65 in contact with valve seat 69 to normally close relief valve inlet 36 to relief valve outlet 34. A washer 55 separates valve member 52 from biasing spring 53, which is positioned in a spring cavity 56 with a stop 62. When fluid pressure acting on an opening hydraulic surface 66 exceeds a predetermined valve opening pressure. Valve surface 65 separates from valve seat 69 to open fluid passage 67. Stop 62 defines the maximum travel of valve member 52, which includes a spring cavity vent passage 61, that vents spring cavity 56 to the low pressure at relief valve outlet 34. When installed in pump body 15, o-ring seals 60 and 64 as well as ring back up 63 isolate relief valve inlet 36 from relief valve outlet 34. The cartridge cavity 33 of pump body 15 includes internal threads that match external threads 57 on plug body component 50, allowing simple installation via appropriate torqueing via hex tool opening 58 about centerline 59. The valve opening pressure of pressure relief valve 32 can be finally tuned by adjusting the relative position of plug body component 50 relative to seat body component 51 before attaching the two via an annular weld at weld location 68. In other words, the pre-load from biaser 53 can be adjusted by telescoping plug body component 50 with respect to seat body component 51 until the force produces a predetermined valve opening pressure; the two components are then laser welded at weld location 68.

Figure 3:
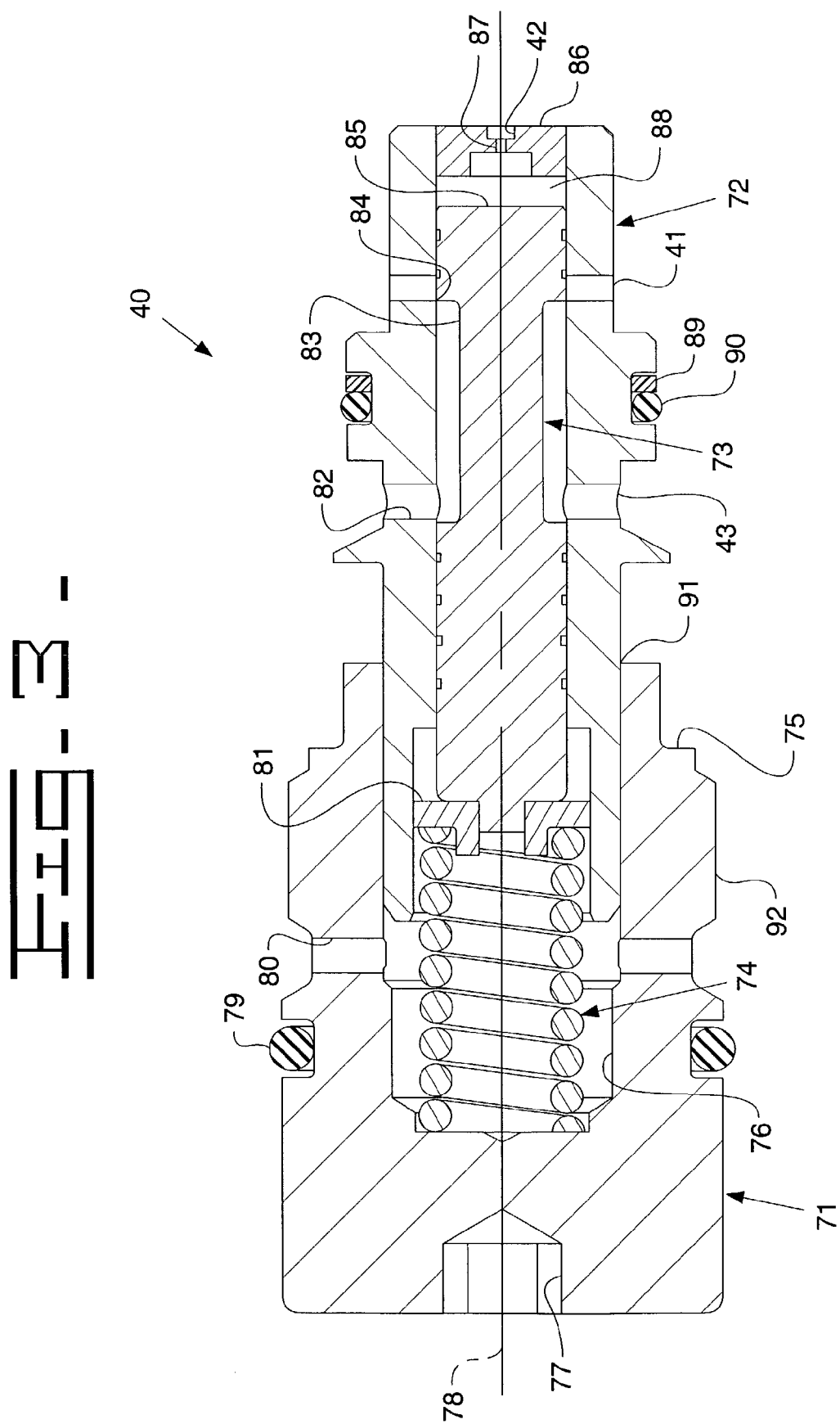
FIG. 3 is a sectioned side diagrammatic view of a pressure reducing valve according to still another aspect of the present invention.

Referring now to FIG. 3, pressure reduction valve 40 shares many features in common with pressure relief valve 32, but performs a much different function. Like pressure relief valve 32, pressure reduction valve 40 includes a plug body component 71 that telescopically receives a seat body component 72, within which are trapped a valve member 73 and a biaser, such as biasing spring 74. A washer 81 separates biaser 74 from valve member 73, which includes a control hydraulic surface 85 oriented in opposition to the force from spring 74. Biasing spring 74 is positioned in a spring chamber 76 that is vented to a low pressure space between o-ring seal 79 and external threads 92 via a spring chamber vent passage 80. Depending upon the fluid pressure in pressure control chamber 88 acting on control hydraulic surface 85, and the force from biasing spring 74, reduction valve inlet 43 can be opened to reduction of outlet 41 past edge seat 84. Thus, in this example embodiment, valve member 73 acts as a spool valve member instead of as a poppet type valve member as in the embodiment of FIG. 2. Pressure control chamber 88 is dampened from the effects of pressure fluctuations upstream of reduction valve pressure tap 42 by the inclusion of a restricted passage 87 defined in a plug 86 attached to seat body component 72. When installed in pump body 15, a seal surface 75 and o-ring seal 90 and ring back up 89 isolate the higher pressure existing at reduction valve inlet 43 from the medium pressure existing at reduction valve outlet 41 and pressure control chamber 88. Like the pressure relief valve 32, pressure reduction valve 40 is installed via a hex tool opening 77 with an appropriate torque about centerline 78 to seat seal surface 75 in an appropriate seat defined by the pump body in its cartridge cavity. When pressure in the pressure control chamber 88 drops below a predetermined value, valve member 73 moves to a position to open edge seat 84 so that inlet 43 is open to outlet 41 via fluid passage 82, which includes annulus 83. When pressure is higher in pressure control chamber 88, valve member 73 is pushed back toward a position to close edge seat 84. Like the pressure relief valve 32, the valve opening pressure for pressure reduction valve 40 can be established by adjusting the relative position of plug body component 71 to seat body component 72 before they are attached at weld location 91. In addition, the present invention contemplates another valve operation parameter, namely the flow area through pressure reduction valve 40 when valve member 73 is in its open position, since the valve member 73 of pressure reduction valve 40 does not move between fixed stops.

INDUSTRIAL APPLICABILITY

Although the present invention has been illustrated in the context of cartridge valves for a variable delivery pump, the present invention could find potential application in non-cartridge valve situations and/or in fluid handling apparatuses other than pumps. Nevertheless, the present invention finds particular application as a replaceable component in a fixed displacement variable delivery pump for use in supplying fluid to, and controlling pressure in, a common rail fuel injection system for an engine. For instance, those skilled in the art will appreciate that both the pressure relief valve 32 and the pressure reduction valve 40 could find potential application in a wide variety of different fluid systems, that may or may not benefit from a cartridge structure as shown in the illustrated embodiments. In other words, the valves of the present invention need not necessarily be cartridge valves, and could find potential application in fluid handling devices other than pumps.

Referring now to FIGS. 4–9, the assembly procedure for a pressure reduction valve is illustrated to show how a valve according to the present invention can be assembled to produce a predetermined valve operation parameter, such as valve opening pressure, even in the light of geometrical variations in different parts as well as variations in spring strength. An assembly jig 100 includes an upper portion 101 that can be moved or fixed vertically with respect to a lower portion 102. When assembly jig 100 is in operation, a probe 104 can apply a force to control hydraulic surface 85, in a manner simulating fluid pressure if the valve were installed in pump 11. The force on valve member 73 can be measured by force indicator 105 in a known manner. Probe 104 and force indicator 105 are parts of upper portion 101, and maybe fixed in position on the upper portion by a probe clamp 106. The upper portion 101 also includes a seat component clamp 107 that may be maneuvered into a position to clamp seat body component 72 relative to upper portion 101. Likewise, lower portion 102 includes a plug component clamp 120 for clamping onto plug body component 71 of pressure reduction valve 40. Assembly jig 100 also includes a source of pressurized fluid 13, such as pressurized air, connected to reduction valve inlet 41 via an inlet passage 112. Reduction valve inlet 43 is connected to a low pressure source via outlet passage 111, which includes a flow meter 110 that can measure the flow rate of fluid through outlet passage 111, and hence through pressure reduction valve 40. Those skilled in the art will appreciate that source 113 preferably produces a predetermined pressure gradient across pressure reduction valve 40 so that a predetermined flow rate of a known gas at a predetermined pressure gradient can be calibrated to indicate a predetermined flow area through pressure reduction valve 40. This predetermined flow area would be indicative of the flow area through the valve when in its open position. Those skilled in the art will also appreciate that the pressure gradient through or across pressure reduction valve 40 when in assembly jig 100 is in the reverse to that normally experienced when the valve is installed in the pump FIG. 1.

Figure 6:
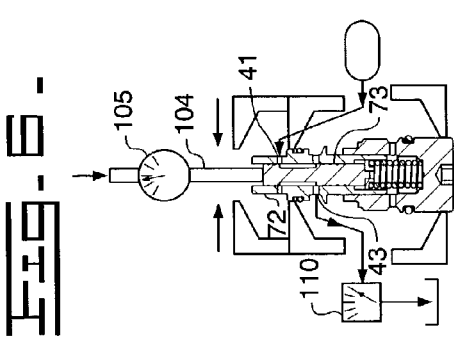
FIGS. 4–9 show the assembly process for a valve of the type shown in FIG. 3.
Figure 9:
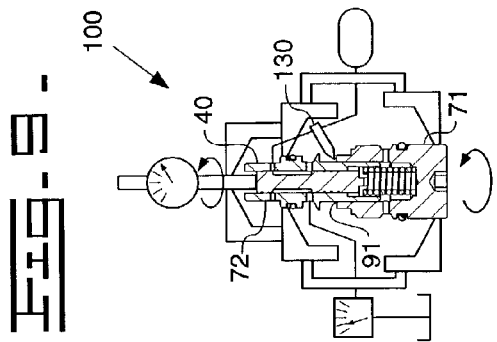
Figure 5:
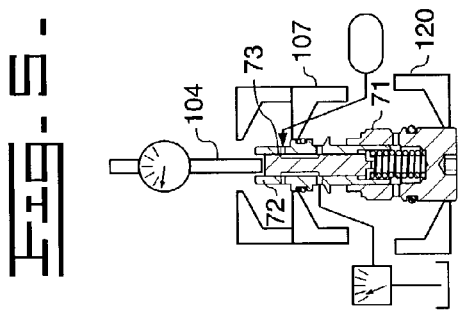
Figure 8:
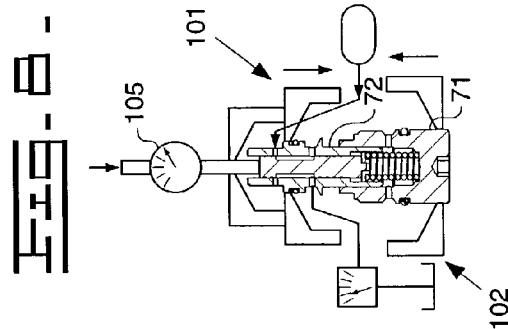
Figure 4:
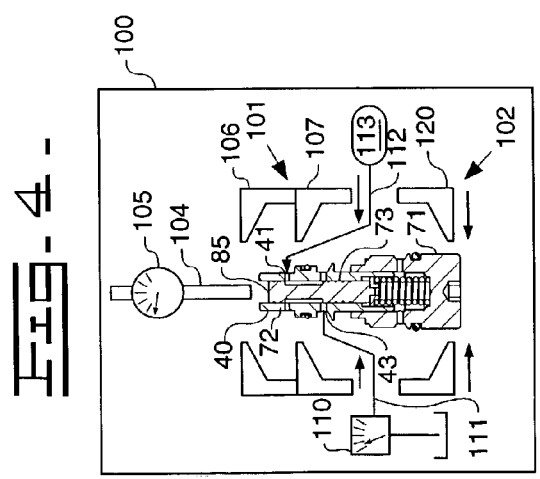
Figure 7:
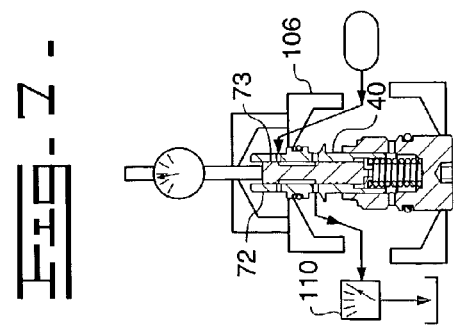

Assembly proceeds by placing the components that make up pressure reduction valve 40 in the gravity held manner shown in FIG. 4 within assembly jig 100. Next, as shown in FIG. 5, plug component 71 is clamped to plug component clamp 120 of lower portion 102, while upper portion 101 clamps to seat body component 72 via seat component clamp 107. In addition, probe 104 is moved into a position adjacent to valve member 73. In the next step, shown in FIG. 6, the flow area through the valve is adjusted by adjusting the position of valve member 73 relative to seat body component 72 with probe 104 until edge seat 84 is closed. This closed point is generally indicated when the pressurized fluid leakage past edge seat 84 is below some predetermined level. At this point, flow meter 110 is recalibrated to zero. Next, the force produced by probe 104 is reduced so that valve member 73 moves toward a position opening flow past edge seat 84. When flow meter 110 indicates some predetermined flow rate, the operator should know that it is indicative of a predetermined flow area past edge seat 84. In the illustrated embodiment, this predetermined flow area is preferably similar to the maximum flow area through the pump output controller 18, so that the pressure reduction valve operation corresponds closely to the flow area fluctuations through the electro hydraulic actuator 27 of the pump controller 18. Thus, when a predetermined flow area through the valve is achieved, probe clamp 106 is activated to fix the position of valve member 73 with respect to seat body component 72 as shown in FIG. 7. In the step shown in FIG. 8, the upper portion 101 is moved vertically with respect to the lower portion 102 until force indicator 105 indicates a predetermined load on valve member 73 when it is in its open position as defined by the steps of FIGS. 6 and 7. This movement causes seat body component 72 to telescope within plug body component 71. Thus, when the desired opening area and opening pressure force are achieved as shown in FIGS. 6, 7 and 8, the two body components are laser welded at weld location 91, such as by rotating assembly jig 100, while appropriately positioning laser welder 130. Those skilled in the art will appreciate that the now assembled pressure reduction valve 40 will be biased toward a closed position but will open when a fluid pressure force in a control hydraulic surface 85 of valve member 73 drops below a predetermined level.

The pressure relief valve 32 is assembled much in a similar manner to that of pressure reduction valve 40, except that no fluid flow rate measurements need be done. In other words, the unattached valve is positioned in the assembly jig 100. The respective seat and body component clamps are then clamped onto the respective seat and body components of the valve. Next, the probe is moved in position into contact with the valve member. Nevertheless, the fluid flow apparatus can still be used as a method of determining when the valve opened in the case of assembling the pressure relief valve 32. The respective body and seat components are telescoped with respect to one another until the probe indicates that the force indicator 105 of probe 104 indicates the desired valve opening pressure. The two body components are then laser welded in a manner similar to that described with respect to the pressure reduction valve 40 assembly.

Those skilled in the art will appreciate that the structure and assembly strategy of the present invention allows tolerances for valve components to be relaxed while at the same time having the ability to tighten the tolerances on an important valve feature, such as a valve operation parameter. In the illustrated embodiments, this valve operating parameter has been illustrated as a valve opening pressure for a pressure reduction valve along with a predetermined valve flow area when such a valve is in its open position, as well as a predetermined valve opening pressure for a pressure relief valve. Thus, the present invention allows for the possible elimination of category parts, such as spacers in order to trim a valve produced to some desired valve opening pressure. By making the valve in a cartridge form and laser welding it, a tamper resistant package is produced that is an easily serviceable aspect of the pump illustrated in FIG. 1. Thus, the present invention provides a structure and methodology capable of reducing costs while simultaneously improving quality, reliability, and predictability.

It should be understood that the above description is intended for illustrative purposes only, and is not intended to limit the scope of the present invention in any way. For instance, while the invention has been illustrated in the context of hydraulic valves, the present invention is also applicable to pneumatic systems. In addition, while the invention has been illustrated in the context of a valve opening pressure, the invention is also applicable to setting a valve member movement force. That force could be supplied by fluid pressure or an electrical actuator. In addition, valve movement may be a closing force in another application, rather than valve opening forces as in the illustrated embodiments. Thus, those skilled in the art will appreciate that other aspects, objects, and advantages of the invention can be obtained from a study of the drawings, the disclosure and the appended claims.

What is claimed is:

1. A valve assembly comprising:
    a valve body including a first body component being slidably received in a second body component, and permanently fixed with respect to said second body component in a selected relative position;
    a valve member at least partially positioned in the valve body and being movable between a first position and a second position;
    the valve member being in contact with a valve seat to close an inlet to an outlet when in the first position, and the valve member being out of contact with the seat to open the inlet to the outlet when the valve member is in the second position;
    a biaser operably positioned to bias the valve member toward the first position; and
    said selected relative position corresponding to a predetermined nonadjustable valve opening pressure based upon an adjusted biaser pre-load before the first body component is permanently fixed with respect to the second body component.

2. A valve assembly comprising:
a valve body including a first body component being slidably received in a second body component, and permanently fixed with respect to said second body component in a selected relative position;
said selected relative position corresponding to a predetermined nonadjustable valve operation parameter;
a valve member movably positioned in said valve body;
said valve body defines an inlet and an outlet; and
said valve member moving to a position that opens said inlet to said outlet when a control force on said valve member is less than a valve opening force.

3. A valve assembly comprising:
a valve body including a first body component being slidably received in a second body component, and permanently fixed with respect to said second body component in a selected relative position;
said selected relative position corresponding to a predetermined nonadjustable valve operation parameter;
a valve member at least partially positioned in said valve body, and being movable between a first position and a second position;
a biaser operably coupled to bias said valve member toward said first position;
said valve member includes a control surface oriented in opposition to a force from said biaser; and
said biaser includes a spring that biases said valve member toward a position that opens an inlet to an outlet.

4. A valve assembly comprising:
a valve body including a first body component being slidably received in a second body component, and permanently fixed with respect to said second body component in a selected relative position;
said selected relative position corresponding to a predetermined nonadjustable valve operation parameter;
a pair of exposed annular sealing members mounted on an outside surface of said valve body for sealing contact when the valve assembly is mounted in another body; and
said valve body defining at least one fluid passage located in an area between said annular sealing members.

5. The valve assembly of claim 4 wherein said valve body includes a set of external threads that include an exposed initial thread for threadably attaching the valve body into another body.

6. The valve assembly of claim 4 wherein said at least one fluid passage includes one of an inlet and an outlet;
an other of said inlet and said outlet opening through said valve body at a location outside said area.

7. A valve assembly comprising:
a valve body including a first body component being slidably received in a second body component, and permanently fixed with respect to said second body component in a selected relative position;
said selected relative position corresponding to a predetermined nonadjustable valve operation parameter;
said predetermined valve operation parameter includes a predetermined fluid flow area past a valve member when in an open position due to a predetermined pressure force acting on a control hydraulic surface; and
the valve member is a spool valve member.

8. A method of assembling a valve, comprising the steps of:
adjusting a relative positioning of a first body component relative to a second body component in an assembly jig until reaching a relative position that corresponds to a predetermined valve operation parameter;
measuring the valve operation parameter during valve assembly;
the reaching step is based at least in part on the measured valve operation parameter; and
permanently fixing the first body component to the second body component in the relative position to render the valve operation parameter nonadjustable.

9. The method of claim 8 wherein the adjusting step includes a step of setting a predetermined valve opening pressure.

10. The method of claim 9 wherein the adjusting step includes a step of telescopically sliding the first body component with respect to the second body component, and compressing a biaser.

11. The method of claim 8 wherein the adjusting step includes a step of measuring a biasing force on a valve member when said first body component and said second body component are at a plurality of relative positions.

12. The method of claim 8 wherein the adjusting step includes a step of measuring a flow rate through the valve for a predetermined fluid at a predetermined pressure gradient.

13. The method of claim 8 wherein the adjusting step includes a step of applying a force with a probe to a valve member in opposition to a biaser.

14. A pump comprising:
a pump body that defines a plurality of threaded bores;
a cartridge valve assembly threadably received in each said threaded bore of said pump body; and
each said cartridge valve having a valve body that includes a first body component fixed with respect to a second body component in a selected relative position corresponding to a predetermined valve operation parameter.

15. The pump of claim 14 wherein at least one said cartridge valve has an inlet that opens to an outlet when a pressure force on a valve member is less than a first valve opening pressure; and
at least one other said cartridge valve includes an inlet that opens to an outlet when a pressure force on a valve member is greater than a second valve opening pressure.

16. The pump of claim 14 wherein each said cartridge valve includes two annular sealing locations along its length on its outer surface.

17. The pump of claim 14 wherein one said cartridge valve is a pressure reduction valve coupled to an electro hydraulic actuator, and includes a reduction valve inlet, a reduction valve outlet and a reduction valve pressure tap.

18. The pump of claim 17 wherein said reduction valve inlet is fluidly connected to a hich pressure outlet gallery of the pump;
said reduction valve outlet is fluidly connected to said electro hydraulic actuator; and
said reduction valve pressure tap is fluidly connected to said electro hydraulic actuator.

* * * * *